United States Patent

Fitsch et al.

[11] Patent Number: 5,948,979
[45] Date of Patent: Sep. 7, 1999

[54] RADAR-BASED METHOD OF MEASURING THE LEVEL OF A MATERIAL IN A CONTAINER

[75] Inventors: Carsten Fitsch, Bad Säkingen; Wolfgang Lubcke, Steinen; Peter Gerst, Weil/Rhein; Jürgen Lau, Lörrach, all of Germany

[73] Assignee: Endress + Hauser GmbH + Co., Maulburg, Germany

[21] Appl. No.: 09/089,652

[22] Filed: Jun. 3, 1998

[30] Foreign Application Priority Data

Jun. 5, 1997 [DE] Germany .................. 197 23 646

[51] Int. Cl.$^6$ ..................................... G01F 23/00
[52] U.S. Cl. ........................................... 73/290 V
[58] Field of Search .............. 73/290 V, 290 R

[56] References Cited

U.S. PATENT DOCUMENTS

| | | | |
|---|---|---|---|
| 4,833,918 | 5/1989 | Jean et al. | 73/290 V |
| 5,136,299 | 8/1992 | Edvardsson | 73/290 V |
| 5,406,842 | 4/1995 | Locke | 73/290 R |
| 5,438,867 | 8/1995 | Van Der Pol | 73/290 V |
| 5,611,239 | 3/1997 | Klinshteyn | 73/290 V |
| 5,614,831 | 3/1997 | Edvardsson | 73/290 V |
| 5,614,911 | 3/1997 | Otto et al. . | |
| 5,760,309 | 6/1998 | Maltby et al. | 73/290 V |
| 5,799,534 | 9/1998 | Van Der Pol | 73/290 V |

FOREIGN PATENT DOCUMENTS 43 27 333 A 1   2/1995   Germany .

Primary Examiner—Richard Chilcot
Assistant Examiner—Jewel V. Thompson
Attorney, Agent, or Firm—Bose McKinney & Evans LLP

[57] ABSTRACT

For measuring the level of a material in a container on the basis of the radar principle, microwaves are radiated downwards and reflected microwaves received by means of the antenna of a ranging device arranged above the highest level anticipated. In the normal measuring operation the received microwaves are evaluated in the distance range up to empty distance corresponding to the distance of the antenna from the bottom of the container for determining the echo waves reflected from the surface of the material, for measuring the transit time of the echo waves and for computing the distance of the material surface from the antenna of the ranging device from the measured transit time. In order to reliably detect the empty condition of a container having a curved bottom, despite the multiple reflections of the microwaves reflected from the container bottom, when no echo waves are detected in the distance range up to the empty distance, the evaluation is done in an enlarged distance range and any echo waves detected in the enlarged distance range beyond the empty distance are assigned to the empty distance.

15 Claims, 2 Drawing Sheets

RADAR-BASED METHOD OF MEASURING THE LEVEL OF A MATERIAL IN A CONTAINER

BACKGROUND OF THE INVENTION

1. Field of the Invention

The invention relates to a radar-based method of measuring the level of a material in a container in which, by means of the antenna of a ranging device arranged above the highest level anticipated, microwaves are radiated downwards and reflected microwaves received and the received microwaves are evaluated for determining the echo waves reflected from the surface of the material, for measuring the transit time of the echo waves and for computing the distance of the material surface from the antenna of the ranging device from the measured transit time.

The level to be measured in the container is either the filling height, i.e. the height of the material surface above the bottom of the container, or the volume of the material. The method as indicated above directly produces the filling height as the difference between the known height of installation of the antenna above the bottom of the container and the measured distance of the material surface from the antenna. The material volume unambiguously relates to the filling height and thus results from the measured filling height.

In application of this method when the container is empty the microwaves are reflected from the bottom of the container instead of from the material surface. This results in no problem as long as the bottom of the container is flat. In this case the microwaves are reflected directly back to the antenna and their transit time corresponds to the distance between the antenna and the bottom of the container; this distance being termed the empty distance. Since the empty distance is the maximum distance anticipated, evaluation of the received microwaves in the ranging device merely needs to be done in the distance range extending as far as this empty distance.

When, however, this method is put to use in the case of a container having a curved container bottom, for example when a so-called dished bottom is employed, and when the container is empty, the microwaves are no longer reflected back to the antenna directly, due to the angle of incidence at the curved container bottom being other than 90°. Instead, the microwaves attain the antenna after having been multiply reflected by the walls of the container. Accordingly, the transit time of the microwaves corresponds to a distance which is substantially greater than the empty distance. Evaluating the received microwaves only in the distance range extending as far as the empty distance would then result in no echo waves whatsoever being detected, i.e. the ranging device will thus not recognize the empty condition of the container, it instead indicating a fault condition.

2. Description of the Prior Art

In solving this problem hitherto for containers having a curved bottom, the evaluation of the received microwaves is permanently done in a distance range which is very much greater than the empty distance. The correct level is assigned to all transit times of echo waves measured between the shortest transit time corresponding to the maximum level (100%) and a very low level (for example 0.01%), whereas a level of 0% is assigned to all longer transit times.

One drawback of this solution employed hitherto is that a very large time and distance range always needs to be covered, i.e. also in the normal measuring operation with the container partly or completely filled.

SUMMARY OF THE INVENTION

The object of the invention is to provide a method of the aforementioned kind in which in the normal measuring operation with a container partly or completely filled and featuring a curved bottom the evaluation of the received microwaves can remain restricted to the distance range extending as far as the empty distance, and by which nevertheless the empty condition of the container can be reliably detected and indicated.

For achieving this object the invention provides a radar-based method of measuring the level of a material in a container in which, by means of the antenna of a ranging device arranged above the highest level anticipated, microwaves are radiated downwards and reflected microwaves received and the received microwaves are evaluated for determining the echo waves reflected from the surface of the material, for measuring the transit time of the echo waves and for computing the distance of the material surface from the antenna of the ranging device from the measured transit time, wherein in the normal measuring operation the received microwaves are evaluated in the distance range up to the empty distance corresponding to the distance of the antenna from the bottom of the container and, when no echo waves are detected in this distance range, the evaluation is done in an enlarged distance range and any echo waves detected in the enlarged distance range beyond the empty distance are assigned to the empty distance.

In the application of the method in accordance with the invention evaluating the received microwaves is initially always restricted to the distance range which ends at the empty distance. It is only when no echo waves are detected in this distance range, which is particularly the case when the container is empty, that the evaluation is effected in the enlarged distance range. When echo waves are detected in this enlarged distance range on the far side of the empty distance, then it is established that these echo waves originate from reflections at the curved bottom of the container and that the container is empty, whereas when no echo waves are detected in the enlarged distance range, either, then it is established that a fault condition exists which can be indicated.

As soon as echo waves are again detected in the distance range extending as far as the empty distance, the enlargement of the distance range is cancelled, the use of the enlarged distance range thus being restricted to the relatively seldom case of the container being empty.

The enlarged distance range is dimensioned at least as large so that all echo waves are detected therein which are reflected from the curved bottom of the container and arrive at the antenna following multiple reflections. As a simplification the enlarged distance range can be made equal to the maximum measurement range of the ranging device.

The advantage achieved by the invention becomes particularly evident when in accordance with a preferred embodiment for evaluating received microwaves their echo profile is plotted in the distance range provided for evaluation. In this case, the task of plotting the echo profile of the received microwaves is restricted to the relatively small distance range extending up to the empty distance for the vast majority of the measuring operations involved.

BRIEF DESCRIPTION OF THE DRAWINGS

Further features and advantages of the invention are apparent from the following description of an example embodiment with reference to the drawings in which.

DESCRIPTION OF THE PREFERRED EMBODIMENT

Figure 1:
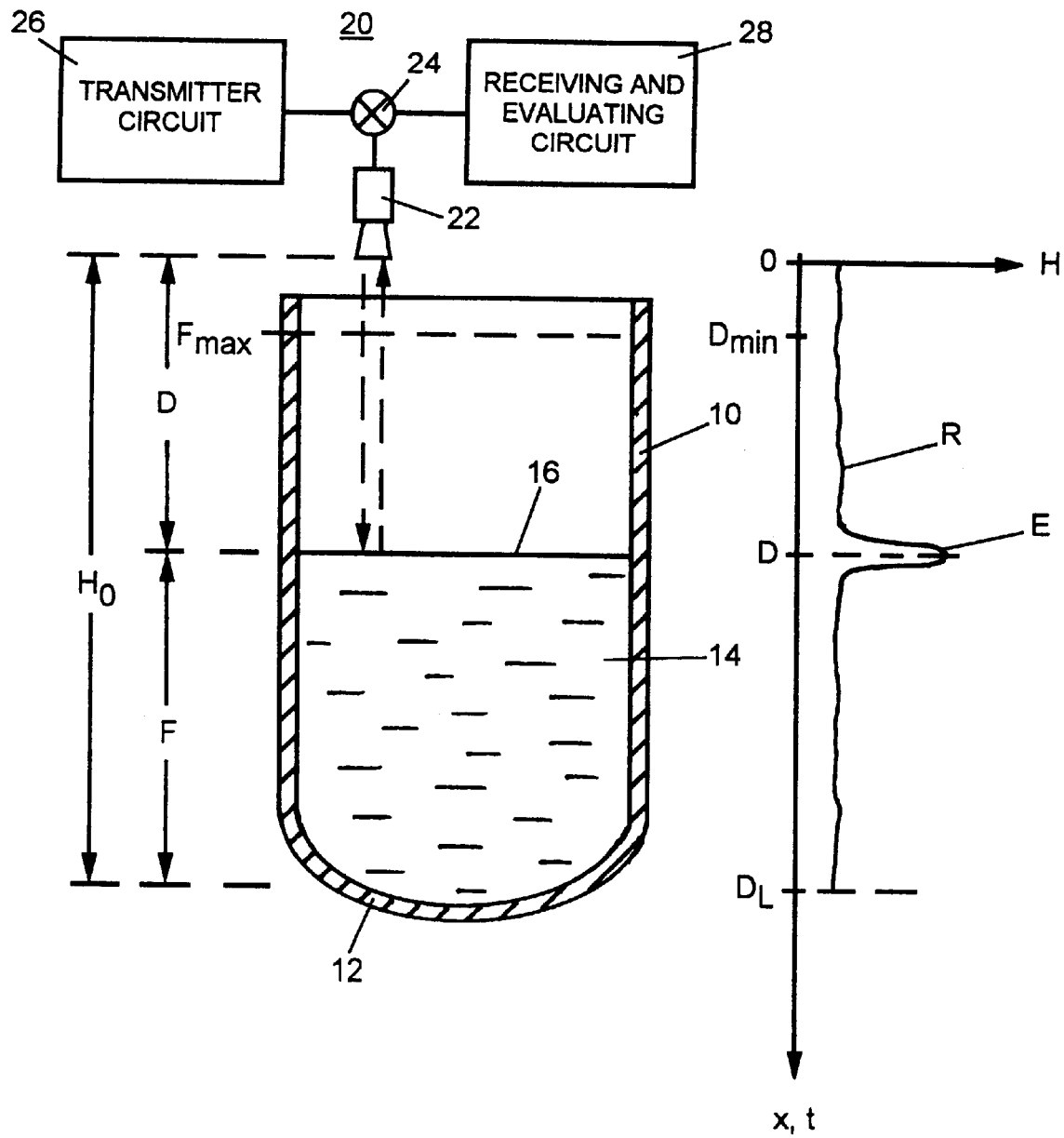
FIG. 1 is a schematic illustration of an an assembly for radar-based level measuring in a container having a curved bottom with the container partly filled and FIG. 2 illustrates the assembly as shown in FIG. 1 with the container empty.

Referring now to FIG. 1 there is illustrated a container 10 having a curved bottom 12, for example a so-called dished bottom. The container 10 is filled up to a filling height F with a material 14. The level in the container 10 is identified either as the filling height F or the volume of the material 14 corresponding to the filling height F. In a container having a constant cross-section over its full height the material volume is proportional to the filling height F; in containers failing to satisfy this requirement the relation between the filling height F and the material volume can be determined by calculation or by trial and represented by a curve or by a look-up table. In any case, measuring the filling height F suffices to measure the level in the container.

In the container 10 as shown in FIG. 1 measuring the filling height F is done by a ranging device 20 operating as a microwave pulsed radar system. The ranging device 20 contains a transceiver antenna 22 which is connected via a duplexer 24 to a transmitter circuit 26 and to a receiving and evaluating circuit 28. The transmitter circuit 26 generates in periodic time intervals ultra-high frequency pulses which are fed to the antenna 22. The antenna 22 is arranged above the maximum filling height $F_{max}$ anticipated in the container 10 so that it radiates the ultra-high frequency pulses arriving from the transmitter circuit 26 perpendicularly downwards in the form of microwaves and receives microwaves coming from below. The microwaves received by the antenna 22, to which more particularly the echo waves reflected from the surface 16 of the material belong, are fed to the receiving and evaluating circuit 28. In the receiving and evaluating circuit 28 the microwaves received by the antenna 22 are evaluated to detect the echo waves reflected from the surface of the material and to measure their transit time. From the measured transit time between the instant of transmission of a microwave pulse by the antenna and arrival of the echo pulse reflected from the material surface 16 at the antenna 22 the distance D between the antenna 22 and the material surface 16 can be computed due to the known propagation velocity of the microwaves. The filling height F is then given by the difference between the installation height Ho of the antenna 22 above the container bottom 12 and the measured distance D:

$F = H_O - D$.

For evaluating the received microwaves in the receiving and evaluating circuit 28 it is usual to plot the echo profile of the microwaves, which is given by the envelope curve of the microwaves in the case of a pulsed radar. The plot of this envelope curve H as a function of the transit time t or, which is the same in effect, the distance x covered by the microwaves, is depicted in FIG. 1 to the right of the container 10. In this representation the time axis t or the distance axis x is oriented perpendicularly downwards whilst the ordinate representing the amplitude of the envelope curve H is oriented to the right. This way of representation makes the relation between the envelope curve and the filling height F to be measured particularly clear. The distance $D_{min}$ corresponds to the maximum filling height $F_{max}$ and the distance $D_L$ which is equal to the installation height $H_O$ corresponds to the empty container and is thus termed the "empty distance". It will be noted that the envelope curve H has over almost the full distance range between the distance $D_{min}$ and the distance $D_L$ a relatively low value R corresponding to the noise level; the envelope curve exhibiting, however, at the distance D corresponding to the the distance of the material surface 16 away from the antenna 22, a spike E originating from echo waves reflected by the material surface 16. On a time scale the position of the echo spike E corresponds to twice the value of the transit time required by the microwaves to cover the distance D since they need to cover this distance twice, from the antenna 22 to the material surface 16 and back again to the antenna.

To determine the wanted echo E in the envelope curve H various methods may be employed. A first method involves determining the maximum of the envelope curve and assigning the wanted echo thereto. In accordance with another method the echo first arriving in time is determined in addition to the echo having the largest amplitude, i.e. the maximum of the envelope curve. When the amplitude of this first echo is greater than the maximum amplitude reduced by an adjustable factor the first echo is selected as the wanted echo. The condition for this may be, for example, that the amplitude of the first echo needs to be greater than the maximum amplitude reduced by 20 dB. Determining the wanted echo is done in the normal measuring operation with the container completely or partly filled in the distance range extending from the distance 0 or at least from the minimum distance $D_{min}$ corresponding to the maximum filling height to the empty distance $D_L$, as a result of which the envelope curve H then also needs to be plotted in this range only.

Figure 2:
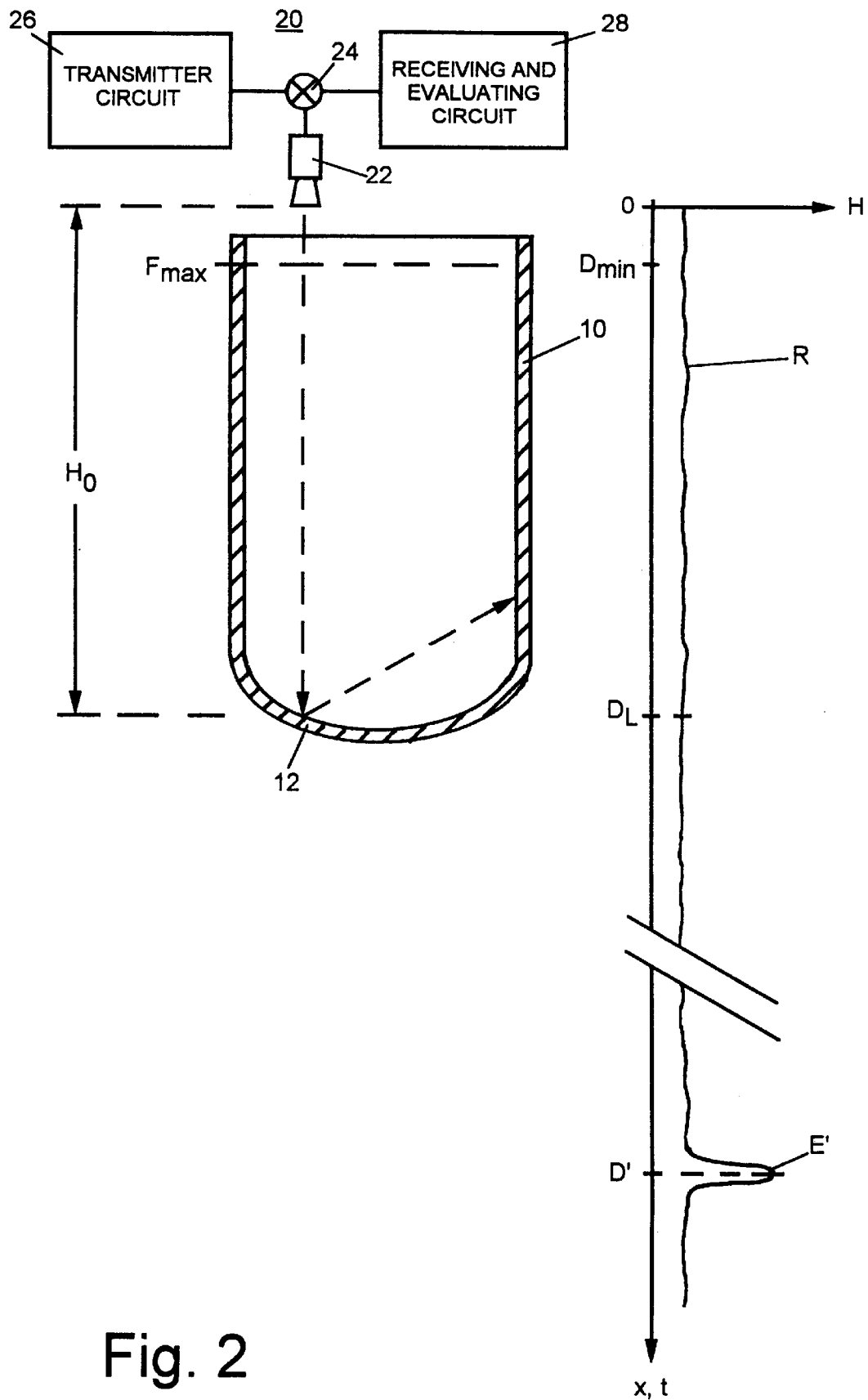

FIG. 2 shows the assembly as shown in FIG. 1 for the case that the container 10 is totally empty. In this case the microwaves are reflected from the bottom 12 of the container, as a result of which the echo spike would need to be at the empty distance $D_L$. However, in FIG. 2 the echo spike E' is located at a much greater distance D' away. This is due to the fact that the microwaves are not directly reflected back to the antenna 22 from the curved bottom of the container due to the angle of incidence being other than 90°, they instead arriving at the antenna 22 after having been multiply reflected by the walls of the container.

Since in the receiving and evaluating circuit 28, as already explained, the envelope curve of the received microwaves is evaluated in the normal measuring operation only in the distance range up to the empty distance DL no echo spike appears in the range evaluated due to the curved container bottom 12 with the container empty so that, on the one hand, there is no recognizing whether the container 10 is empty and, on the other, this gives the wrong impression that the ranging device 20 is not working.

These wrong indications are avoided by the following measures:

1. If, in evaluating the envelope curve H, it is established that no echo exists in the evaluated distance range up to the empty distance $D_L$ an envelope curve is again plotted but this time for an enlarged distance range preferably corresponding to the maximum measurement range of the ranging device. If an echo is detected on the far side of the empty distance $D_L$ in evaluating this envelope curve, such as the echo E' as shown in FIG. 2, this echo is not assigned the distance D' corresponding to its transit time but the empty distance $D_L$. As a result of this it is, on the one hand, correctly indicated that the container is empty and, on the other, it is established that the ranging device 20 is working properly.

2. If in evaluating the envelope curve in the enlarged distance range no echo is detected, either, then a fault condition is indicated.

In this way it is achieved in the normal measuring operation that evaluating the received microwaves, for example by plotting their envelope curve, is restricted to the range corresponding to the height of the container, but that with the container empty and despite the curved container bottom a correct indication of the empty condition is assured whilst avoiding a false indication of a fault condition.

Evaluating the received microwaves in the enlarged distance range can be additionally linked to the condition that the level last measured was less than a reference level, for example a level amounting to 20% of the maximum filling height. In this way it is avoided that the evaluation range is changed should the echo be lost briefly, for example, due to an agitator crossing the path of the microwaves.

The decision as to whether an echo is detected in the enlarged distance range or whether a fault condition is indicated can be made dependent on an adjustable threshold value. The threshold value stipulates a minimum value for the signal-to-noise ratio which the echo amplitude needs to exceed to be accepted as an echo. The threshold value has typically the order of magnitude of 10 dB.

The definition of the empty distance $D_L$ is also apparent from FIG. 2. It corresponds to the distance from the antenna 22 up to the point of the curved container bottom 12 where the microwaves emitted by the antenna impinge and are reflected. This distance is the maximum distance which can be measured in the container 10 by means of the antenna 22. The horizontal plane passing through the point of impingement also is the reference plane for the filling height F and the installation height Ho. The container 10 is considered to be empty when the material surface 16 is level with or below this plane.

In the example embodiment as discussed above, level measuring was done on the basis of a pulsed radar system. It will be appreciated, however, that the invention is not restricted to this system, it also being suitable for other methods working according to the radar principle, more particularly for those in which an echo profile can be generated. This applies especially to FMCW radar (Frequency Modulated Continuous Wave radar). In the FMCW method a continuous microwave is transmitted which is periodically linearly frequency-modulated, for example according to a sawtooth function. The frequency of each received echo signal thus shows a difference to the momentary frequency which the transmitted signal has at the instant of reception, this difference in frequency being a function of the transit time of the echo signal. The difference in frequency between the transmitted signal and the received signal which can be obtained by mixing both signals and evaluating the Fourier spectrum of the mixed signal thus corresponds to the distance of the reflecting surface away from the antenna, and the level of the frequency characteristic corresponds to the amplitude of the echo. Accordingly, this Fourier spectrum represents in this case the echo profile which can be evaluated in the same way as the echo profile obtained by the pulsed radar method.

We claim:

1. A radar-based method of measuring the level of a material in a container in which, by means of the antenna of a ranging device arranged above the highest level anticipated, microwaves are radiated downwards and reflected microwaves received and the received microwaves are evaluated for determining the echo waves reflected from the surface of the material, for measuring the transit time of the echo waves and for computing the distance of the material surface from the antenna of the ranging device from the measured transit time, wherein in the normal measuring operation the received microwaves are evaluated in the distance range up to the empty distance corresponding to the distance of the antenna from the bottom of the container and, when no echo waves are detected in this distance range, the evaluation is done in an enlarged distance range and any echo waves detected in the enlarged distance range beyond the empty distance are assigned to the empty distance.

2. The method as set forth in claim 1 wherein the enlarged distance range corresponds to the maximum distance measurement range of the ranging device.

3. The method as set forth in claim 1 wherein, for evaluating the received microwaves, the echo profile thereof is plotted in the distance range provided for the evaluation.

4. The method as set forth in claim 1 wherein the evaluation is done in the enlarged distance range only when the previously measured level was smaller than a predetermined reference level.

5. The method as set forth in claim 1 wherein a fault condition is indicated when no echo waves are detected in the enlarged distance range, either.

6. The method as set forth in claim 1 wherein in the enlarged distance range only microwaves whose amplitude exceeds a predetermined threshold value are detected as echo waves.

7. The method as set forth in claim 2 wherein, for evaluating the received microwaves, the echo profile thereof is plotted in the distance range provided for the evaluation.

8. The method as set forth in claim 2 wherein the evaluation is done in the enlarged distance range only when the previously measured level was smaller than a predetermined reference level.

9. The method as set forth in claim 2 wherein a fault condition is indicated when no echo waves are detected in the enlarged distance range, either.

10. The method as set forth in claim 2 wherein in the enlarged distance range only microwaves whose amplitude exceeds a predetermined threshold value are detected as echo waves.

11. A radar-based method of measuring the level of a material surface in a container using a ranging device having a microwave antenna in said container at a predetermined empty distance from a bottom surface of said container to form a distance range, said method comprising the steps of:

radiating microwaves downwardly toward said material surface;

receiving microwaves reflected from inside said container; and determining whether an echo wave is reflected from said material surface within said distance range;

wherein if the result of said determining step is affirmative, computing said level of said material surface based upon a transit time of said echo wave; and wherein if the result of said determining step is negative, evaluating said microwaves to determine whether an echo wave is reflected within an enlarged distance range which extends beyond said distance range.

12. The method of claim 11, wherein said enlarged distance range corresponds to the maximum distance measurement range of said ranging device.

13. The method of claim 11, wherein the evaluating step in said enlarged distance range is performed only when the previously measured level of said material surface is below a predetermined reference level.

14. The method of claim 11, further comprising the step of indicating a fault condition when the evaluating step in said enlarged distance range does not detect an echo wave.

15. The method of claim 11, wherein only microwaves whose amplitude exceeds a predetermined threshold value are detected as echo waves.

* * * * *